United States Patent
Hong

(10) Patent No.: US 11,483,747 B2
(45) Date of Patent: Oct. 25, 2022

(54) METHODS OF RESTORING WIRELESS BACKHAUL LINK AND ESTABLISHING WIRELESS BACKHAUL LINK, NR WIRELESS BACKHAUL BASE STATION, AND NR DONOR BASE STATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 4 days.

(21) Appl. No.: 17/048,588

(22) PCT Filed: Apr. 23, 2018

(86) PCT No.: PCT/CN2018/084115
§ 371 (c)(1),
(2) Date: Oct. 17, 2020

(87) PCT Pub. No.: WO2019/204966
PCT Pub. Date: Oct. 31, 2019

(65) Prior Publication Data
US 2021/0168671 A1   Jun. 3, 2021

(51) Int. Cl.
*H04W 36/00* (2009.01)
*H04W 36/08* (2009.01)
(Continued)

(52) U.S. Cl.
CPC . *H04W 36/0058* (2018.08); *H04W 36/00837* (2018.08); *H04W 36/08* (2013.01);
(Continued)

(58) Field of Classification Search
None
See application file for complete search history.

(56) References Cited

U.S. PATENT DOCUMENTS 10,292,095 B1 * 5/2019 Park .................. H04B 7/026
2007/0110005 A1   5/2007 Jin et al.
(Continued)

FOREIGN PATENT DOCUMENTS

CN    1964521 A    5/2007
CN  102480316 A    5/2012
(Continued)

OTHER PUBLICATIONS

CN Office Action and Search Report in Application No. 201880000447.5, dated Mar. 19, 2021.
(Continued)

*Primary Examiner* — Kenny S Lin
(74) *Attorney, Agent, or Firm* — Syncoda LLC; Feng Ma

(57) ABSTRACT

A method for restoring a wireless backhaul link includes: measuring the signal quality of a first wireless backhaul link between a first new radio (NR) host station being accessed by a NR wireless backhaul base station and the NR wireless backhaul base station; in a case that the signal quality of the first wireless backhaul link is less than a link reselection threshold corresponding to the NR wireless backhaul base station, beginning a new search for an adjacent NR host station; measuring signal quality of a second wireless backhaul link between the NR wireless backhaul base station and a second NR donor base station; and initiating, when the signal quality of the second wireless backhaul link being greater than a first threshold continues a duration exceeding a first time length, a random access request to the second NR donor base station, so as to establish a wireless backhaul link with the second NR donor base station.

10 Claims, 9 Drawing Sheets

(51) Int. Cl.
*H04W 36/30* (2009.01)
*H04W 76/19* (2018.01)
*H04W 88/14* (2009.01)

(52) U.S. Cl.
CPC ........... *H04W 36/30* (2013.01); *H04W 76/19* (2018.02); *H04W 88/14* (2013.01)

(56) References Cited

U.S. PATENT DOCUMENTS

| | | | |
|---|---|---|---|
| 2014/0064158 A1 | 3/2014 | Timus | |
| 2014/0126410 A1 | 5/2014 | Agarwal et al. | |
| 2016/0066336 A1* | 3/2016 | Sevindik | H04W 40/22 370/315 |
| 2016/0286374 A1* | 9/2016 | Baghel | H04B 17/318 |
| 2019/0124696 A1* | 4/2019 | Islam | H04B 7/269 |
| 2020/0045563 A1* | 2/2020 | Luo | H04W 52/42 |
| 2021/0013959 A1* | 1/2021 | Yuan | H04B 7/15571 |

FOREIGN PATENT DOCUMENTS

| | | |
|---|---|---|
| CN | 103517364 A | 1/2014 |
| CN | 103581997 A | 2/2014 |
| CN | 103607774 A | 2/2014 |
| CN | 103686911 A | 3/2014 |
| CN | 104469891 A | 3/2015 |
| CN | 105830530 A | 8/2016 |
| CN | 103517364 B | 9/2016 |
| CN | 106162817 A | 11/2016 |
| CN | 106717071 A | 5/2017 |
| CN | 106982083 A | 7/2017 |
| WO | 2005125233 A1 | 12/2005 |
| WO | 2016153774 A1 | 9/2016 |

OTHER PUBLICATIONS

Extended European Search Report in Application No. 18916602.8, dated Mar. 25, 2021.
CN Written Opinion of the International Searching Authority in Application No. PCT/CN2018/084115, dated Jan. 30, 2019.
Vivo: Initial consideration on dynamic route selection, 3GPP TSG-RAN WG2 Meeting #101 bis, Sanya, China, Apr. 16-20, 2018, R2-1804996.
State Intellectual Property Office of the People's Republic of China, Office Action and Search Report Issued in Application No. 2018800004475, dated Aug. 4, 2020, 16 pages, (Submitted with Machine Translation).
ISA State Intellectual Property Office of the People's Republic of China, International Search Report Issued in Application No. PCT/CN2018/084115, dated Jan. 30, 2019, WIPO, 5 pages.
AT&T, Qualcomm, Samsung, "New SID Proposal: Study on Integrated Access and Backhaul for NR",8881123GPP TSG RAN Meeting #75,Dubrovnik, Croatia,RP-170821,Mar. 6-9, 2017,5 pages.
State Intellectual Property Office of the People's Republic of China, Office Action and Search Report Issued in Application No. 201880000447.5, dated Oct. 9, 2021, 29 pages.
Qualcomm Incorporated, "Enhancements to support NR backhaul links", 3GPP TSG RAN WG1 Meeting #92bis, R1-1804835, Sanya, China, Apr. 16-Apr. 20, 2018, 9 pages.
AT&T, "Discussion on NSA/SA support for IAB architectures", 3GPP TSG-RAN WG3 #99, R3-181346, Athens, Greece, Feb. 26-Mar. 2, 2018, 4 pages.
Ericsson, "Architecture for integrated access and backhaul", 3GPP TSG-RAN WG2 NR AH1801, R2-1801022, Vancouver, Canada, Jan. 22-26, 2018, 9 pages.
Indian Patent Office, Office Action Issued in Application No. 202047047982, dated Dec. 15, 2021, 5 pages.

* cited by examiner

METHODS OF RESTORING WIRELESS BACKHAUL LINK AND ESTABLISHING WIRELESS BACKHAUL LINK, NR WIRELESS BACKHAUL BASE STATION, AND NR DONOR BASE STATION

CROSS-REFERENCE TO RELATED APPLICATION

This application is a national stage of International Application No. PCT/CN2018/084115 filed on Apr. 23, 2018, the disclosure of which is hereby incorporated by reference in its entirety.

TECHNICAL FIELD

The present disclosure relates to the field of communication technology, and more particularly, to methods of restoring a wireless backhaul link, methods of establishing a wireless backhaul link, devices for restoring a wireless backhaul link, devices for establishing a wireless backhaul link, a new radio (NR) wireless backhaul base station, a NR donor base station, and a computer-readable storage medium.

BACKGROUND

With the development of communication technology, mobile communication has experienced a leap development from voice services to mobile broadband data services, which not only profoundly changes people's lifestyles, but also greatly promoted social and economic development. As two main driving forces for the development of future mobile communication, the mobile Internet and the Internet of Things provide broad application scenarios for the 5th Generation (5G) mobile communications technology. Facing 2020 and the future, the thousand times growth of data traffic, hundreds of billions of devices connected and diversified service requirement will all pose severe challenges to the design of 5G systems. 5G will meet people's requirement for ultra-high traffic density, ultra-high density of connection number, and ultra-high mobility, and can provide users with the ultimate service experience of high-definition video, virtual reality, augmented reality, cloud desktops, and online games. 5G will infiltrate the Internet of Things and other fields, and be deeply integrated into industrial facilities, medical equipment, transportation facilities, etc., thereby fully achieving the "Internet of Everything", and effectively satisfying the information service requirement of vertical industries such as industry, medical treatment, transportation, and etc.

In order to meet the requirements of future 5G services that are more diverse, higher speed, and more connection number, it is required to improve spectrum efficiency greatly of 5G networks. And high-frequency communication technology can be an important candidate technology to satisfy the requirement of improving spectrum efficiency and ultra-high speed for 5G networks. The 3rd Generation Partnership Project (3GPP) has also launched a lot of standardization work for high-frequency communications.

Due to the transmission characteristics of high frequency bands, small cells are typically used for high frequency communication. However, in a case that each small cell is provided with traditional backhaul, such as optical fiber, it will require a lot of overhead such as a great quantity of fiber (especially in the case of dense deployment of 5G networks), and appropriate sites are required to support the placement of backhaul. In the New Radio (NR), high frequency bands will be mainly used and be preferably used as wireless backhaul frequency bands. However, high frequency bands are also characterized with easily being blocked and leading to a link break off. Therefore, how to prevent the wireless backhaul link from breaking off is a technical problem to be solved urgently.

SUMMARY

In view of this, the present discloses provides methods devices for restoring a wireless backhaul link, methods and devices for establishing a wireless backhaul link, a new radio wireless backhaul base station, a new radio donor base station, and a computer-readable storage medium, to prevent a wireless backhaul link from breaking off.

According to the first aspect of the embodiments of the present disclosure, there is provided a method of restoring a wireless backhaul link, applicable to a new radio NR wireless backhaul base station, and including:

measuring signal quality of a first wireless backhaul link between the NR wireless backhaul base station and a first NR donor base station being accessed by the NR wireless backhaul base station;

starting, in a case that the signal quality of the first wireless backhaul link is less than a link reselection threshold for the NR wireless backhaul base station, to search for a neighboring NR donor base station;

measuring signal quality of a second wireless backhaul link between the NR wireless backhaul base station and a second NR donor base station which is searched out; and initiating, in a case that the signal quality of the second wireless backhaul link being greater than a first threshold continues for a duration exceeding a first time length, a random access request to the second NR donor base station so as to establish a wireless backhaul link with the second NR donor base station.

In an embodiment of the present disclosure, the method further includes:

disconnecting, in a case that the signal quality of the first wireless backhaul link being less than the link reselection threshold continues for a duration exceeding a second time length, the wireless backhaul link with the first NR donor base station so as to transmit data through the wireless backhaul link between the wireless backhaul base station and the second NR donor base station.

In an embodiment of the present disclosure, the method further includes:

acquiring, from the first NR donor base station, the link reselection threshold.

In an embodiment of the present disclosure, acquiring, from the first NR donor base station, the link reselection threshold includes any one of the following:

acquiring the link reselection threshold from configuration information which is received from the first NR donor base station after accessing the first NR donor base station; and receiving the link reselection threshold from broadcast signaling which is broadcast by the first NR donor base station.

According to a second aspect of the embodiments of the present disclosure, a method of establishing a wireless backhaul link is provided, which is applicable to a new radio NR donor base station, and includes:

receiving a random access request initiated by a NR wireless backhaul base station; and establishing a wireless backhaul link with the NR wireless backhaul base station in response to the random access request.

In an embodiment of the present disclosure, the method further includes any one of the following:

transmitting, in a case that access request from the NR wireless backhaul base station is detected, configuration information to the NR wireless backhaul base station, so that the NR wireless backhaul base station acquires a link reselection threshold from the configuration information; and broadcasting the link reselection threshold through broadcast signaling.

In an embodiment of the present disclosure, the method further includes:

receiving, from the NR wireless backhaul base station, a wireless backhaul link disconnecting request;

disconnecting the wireless backhaul link with the NR wireless backhaul base station in response to the wireless backhaul link disconnecting request.

According to a third aspect of the embodiments of the present disclosure, there is provided a device for restoring wireless backhaul link, applicable to a new radio NR wireless backhaul base station, and including:

a first measuring module, configured to measure signal quality of a first wireless backhaul link between the NR wireless backhaul base station and a first NR donor base station being accessed by the NR wireless backhaul base station;

a searching module, configured to start, in a case that the signal quality of the first wireless backhaul link measured by the first measuring module is less than a link reselection threshold for the NR wireless backhaul base station, to search for a neighboring NR donor base station;

a second measuring module, configured to measure signal quality of a second wireless backhaul link between the NR wireless backhaul base station and a second NR donor base station which is searched out by the searching module; and an access establishing module, configured to initiate, in a case that the signal quality of the second wireless backhaul link measured by the second measuring module being greater than a first threshold continues for a duration exceeding a first time length, a random access request to the second NR donor base station so as to establish a wireless backhaul link with the second NR donor base station.

In an embodiment of the present disclosure, the device further includes:

a disconnecting and transmitting module, configured to disconnect, in a case that the signal quality of the first wireless backhaul link measured by the first measuring module being less than the link reselection threshold continues for a duration exceeding a second time length, the wireless backhaul link with the first NR donor base station so as to transmit data through the wireless backhaul link with the second NR donor base station.

In an embodiment of the present disclosure, the device further includes:

an acquiring module, configured to acquire, from the first NR donor base station, the link reselection threshold before the searching module starting to search for the neighboring NR donor base station.

In an embodiment of the present disclosure, the acquiring module includes any one of the following:

a receiving and acquiring sub-module, configured to acquire configuration information from configuration information which is received from the first NR donor base station receive after accessing the first NR donor base station; and a receiving sub-module, configured to receive the link reselection threshold broadcasted from broadcast signaling which is broadcast by the first NR donor base station.

According to a fourth aspect of the embodiments of the present disclosure, there is provided a device for establishing a wireless backhaul link, applicable to a new radio NR donor base station, and including:

a first receiving module, configured to receive a random access request initiated by a NR wireless backhaul base station; and an establishing module, configured to establish, after the first receiving module responding to the random access request initiated by the NR wireless backhaul base station, a wireless backhaul link with the NR wireless backhaul base station in response to the random access request.

In an embodiment of the present disclosure, the device further includes one of the following:

a transmitting module, configured to transmit, before receiving the random access request initiated by the NR wireless backhaul base station and in a case that the random access request from the NR wireless backhaul base station is detected, configuration information to the NR wireless backhaul base station, such that the NR wireless backhaul base station acquires the link reselection threshold; and a broadcasting module, configured to broadcast, before the first receiving module receiving the random access request initiated by the NR wireless backhaul base station, the link reselection threshold through broadcast signaling.

In an embodiment of the present disclosure, the device further includes:

a second receiving module, configured to receive, from the NR wireless backhaul base station, a wireless backhaul link disconnecting request; and a disconnecting module, configured to disconnect the wireless backhaul link with the NR wireless backhaul base station in response to the wireless backhaul link disconnecting request received by the second receiving module.

According to a fifth aspect of the embodiments of the present disclosure, there is provided an NR wireless backhaul base station including:

a processor;

a memory, configured to store instructions executable by the processor;

wherein, the processor is configured to:

measure signal quality of a first wireless backhaul link between an NR wireless backhaul base station and a first NR donor base station being accessed by the NR wireless backhaul base station;

start, in a case that the signal quality of the first wireless backhaul link is less than a link reselection threshold for the NR wireless backhaul base station, to search for a neighboring NR donor base station;

measure signal quality of a second wireless backhaul link between the NR wireless backhaul base station and a second NR donor base station which is searched out; and initiate, in a case that the signal quality of the second wireless backhaul link being greater than a first threshold continues for a duration exceeding a first time length, a random access request to the second NR donor base station so as to establish a wireless backhaul link with the second NR donor base station.

According to a sixth aspect of the embodiments of the present disclosure, there is provided an NR donor base station, including:

a processor;

a memory, configured to store instructions executable by the processor;

wherein, the processor is configured to:

receive a random access request initiated by an NR wireless backhaul base station; and establish a wireless backhaul link with the NR wireless backhaul base station in response to the random access request.

According to a seventh aspect of the embodiments of the present disclosure, there is provided a computer-readable storage medium having computer instructions stored thereon, wherein in a case that the instructions are executed by a processor, the steps of the method of restoring wireless backhaul link described above are implemented.

According to an eighth aspect of the embodiments of the present disclosure, there is provided a computer-readable storage medium having computer instructions stored thereon, wherein in a case that the instructions are executed by a processor, the steps of the method of establishing wireless backhaul link described above are implemented.

The technical solutions provided by the embodiments of the present disclosure can produce the following beneficial effects:

In a case that the signal quality of the first wireless backhaul link between the NR wireless backhaul base station and the first NR donor base station is less than the link reselection threshold for the NR wireless backhaul base station, it is started to search for the neighboring NR donor base station, and the signal quality of the second wireless backhaul link between the NR wireless backhaul base station and the second NR donor base station which is searched out is measured, and in a case that the signal quality of the second wireless backhaul link being greater than the first threshold continues for a duration exceeding the first time length, a random access request to the second NR donor base station is initiated so as to establish a wireless backhaul link with the second NR donor base station, thereby finding a better wireless backhaul link before the current wireless backhaul link is disconnected, so as to prevent the wireless backhaul link from being broken off.

Through establishing the wireless backhaul link with the NR wireless backhaul base station in response to the random access request initiated by the NR wireless backhaul base station, the NR wireless backhaul base station can establish the wireless backhaul link with the NR donor base station so as to transmit data through the established wireless backhaul link.

It should be understood that the above general description and the following detailed description are only exemplary and explanatory, and cannot be construed as a limit to the present disclosure.

BRIEF DESCRIPTION OF THE DRAWINGS

The drawings herein are incorporated into the specification and constitute a part of the specification, illustrate embodiments in accordance with the present disclosure, and are intended together with the specification to explain the principle of the present disclosure.

DETAILED DESCRIPTION

Here, exemplary embodiments will be described in detail, and examples thereof are illustrated in the accompanying drawings. When the following description refers to the drawings, unless indicated otherwise, the same reference numbers in different drawings indicate the same or similar elements. The implementation manners described in the following exemplary embodiments do not represent all the implementation manners consistent with the present disclosure. Rather, they are merely examples of devices and methods consistent with some aspects of the present disclosure as set forth in the appended claims.

Figure 1:
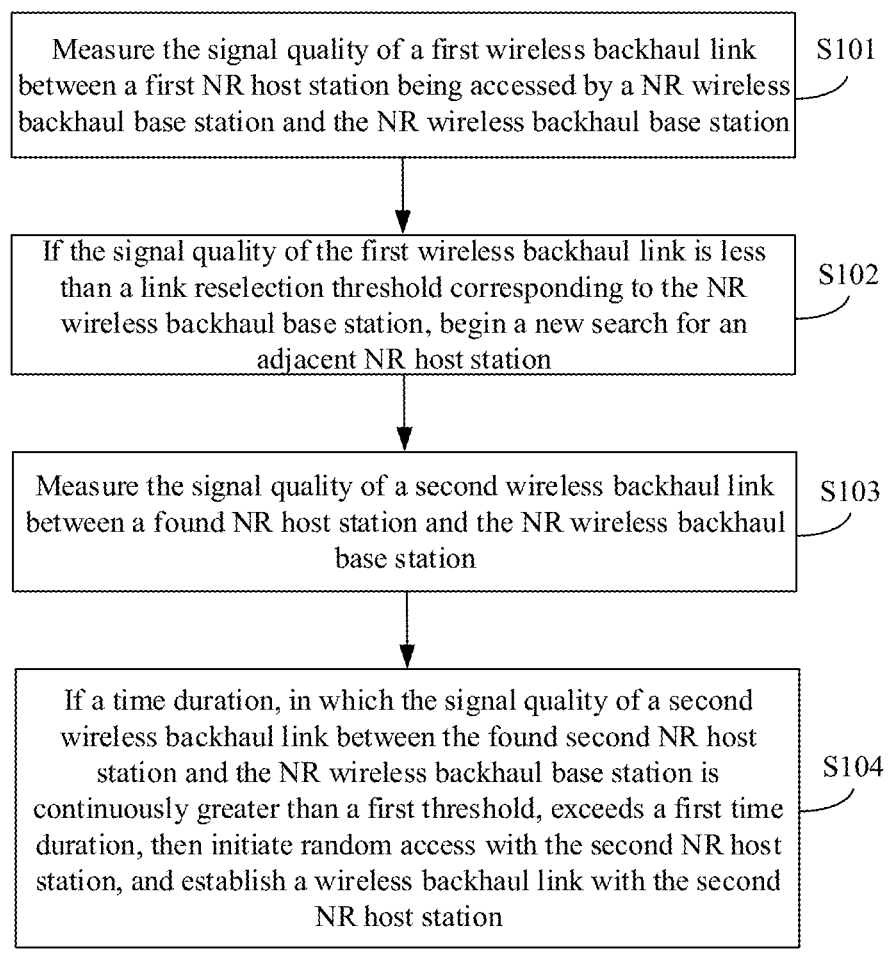
FIG. 1 is a flowchart of a method of restoring a wireless backhaul link according to an exemplary embodiment of the present disclosure.

FIG. 1 is a flowchart of a method of restoring a wireless backhaul link according to an exemplary embodiment of the present disclosure. This embodiment is described from the side of the NR wireless backhaul base station. As illustrated in FIG. 1, the method of restoring wireless backhaul link include:

In step S101, signal quality of a first wireless backhaul link between an NR wireless backhaul base station and a first NR donor base station being accessed by the NR wireless backhaul base station is measured.

Figure 2A:
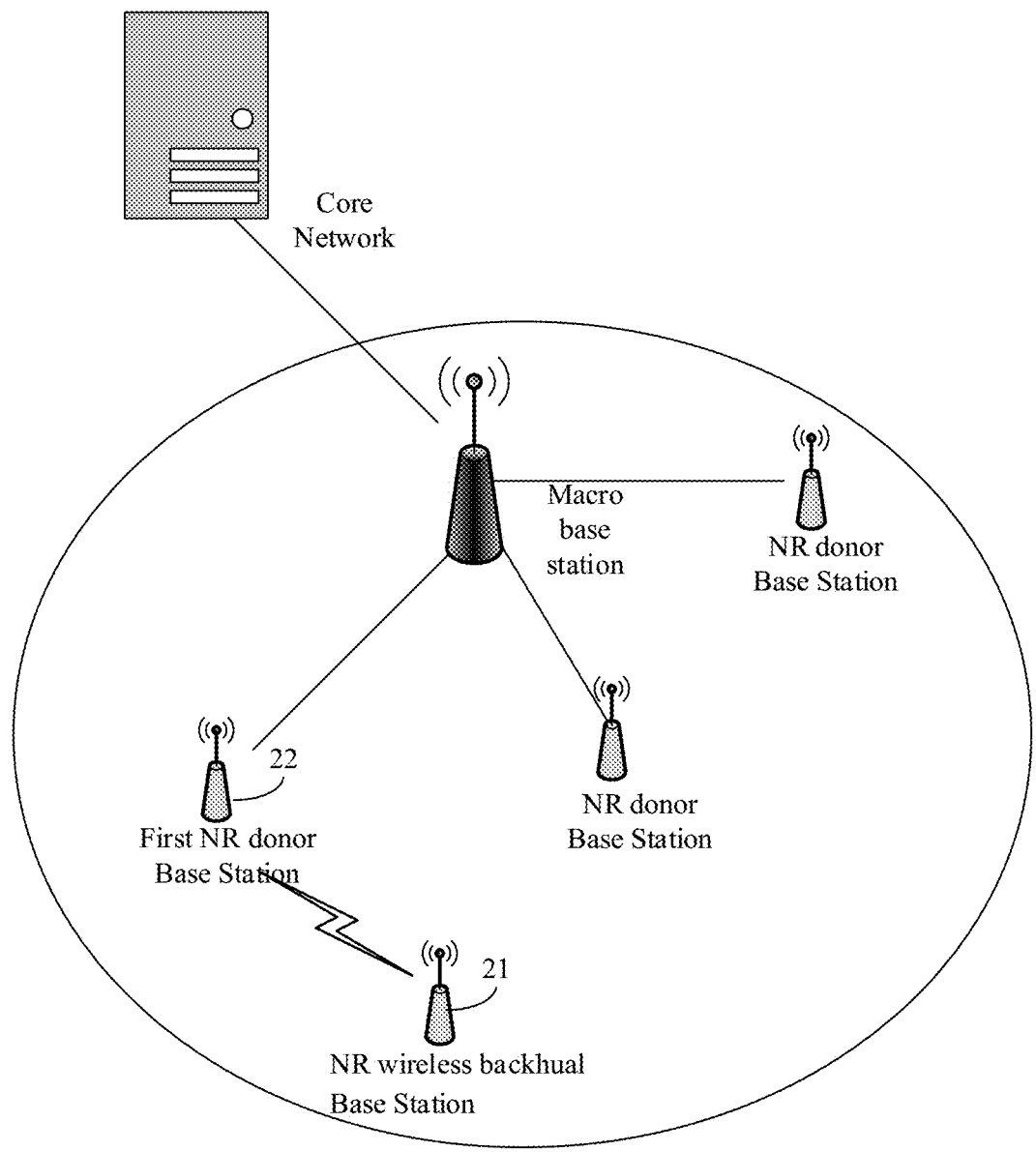
FIG. 2A is a first schematic diagram illustrating a relationship between an NR wireless backhaul base station and an NR donor base station according to an exemplary embodiment of the present disclosure.

As illustrated in FIG. 2A, an NR wireless backhaul base station 21 accesses a first NR donor base station 22, which communicates with the core network through a macro base station in turn. In addition to the first NR donor base station 22, there are additional NR donor base stations communicating with the core network through the macro base station.

It should be noted that FIG. 2A is just a schematic diagram of a relationship between an NR wireless backhaul base station and an NR donor base station. FIG. 2A is introduced here only to describe more clearly the relationship between the NR wireless backhaul base station and the NR donor base station. In practice, the number of NR donor base stations and connection relationships with the NR wireless backhaul base stations may be different from what are illustrated in FIG. 2A.

In this embodiment, the NR wireless backhaul base station, after accessing the first NR donor base station, measures signal quality of a first wireless backhaul link between the NR wireless backhaul base station and the first NR donor base station, for example, reference signal receiving power RSRP or reference signal receiving quality RSRQ, etc.

In step S102, in a case that the signal quality of the first wireless backhaul link is less than a link reselection threshold for the NR wireless backhaul base station, it is started to search for a neighboring NR donor base station.

In step S103, signal quality of a second wireless backhaul link between the NR wireless backhaul base station and a second NR donor base station, which is searched out, is measured.

In step S104, in a case that the signal quality of the second wireless backhaul link being greater than a first threshold continues for a duration exceeding a first time length, a random access request is initiated to the second NR donor base station, so as to establish a wireless backhaul link with the second NR donor base station.

The first time length may be set as required. In a case that the signal quality of the second wireless backhaul link being greater than the first threshold continues for a duration exceeding the first time length, it indicates that a wireless backhaul link may be established between the NR wireless backhaul base station and the second NR donor base station.

Figure 2B:
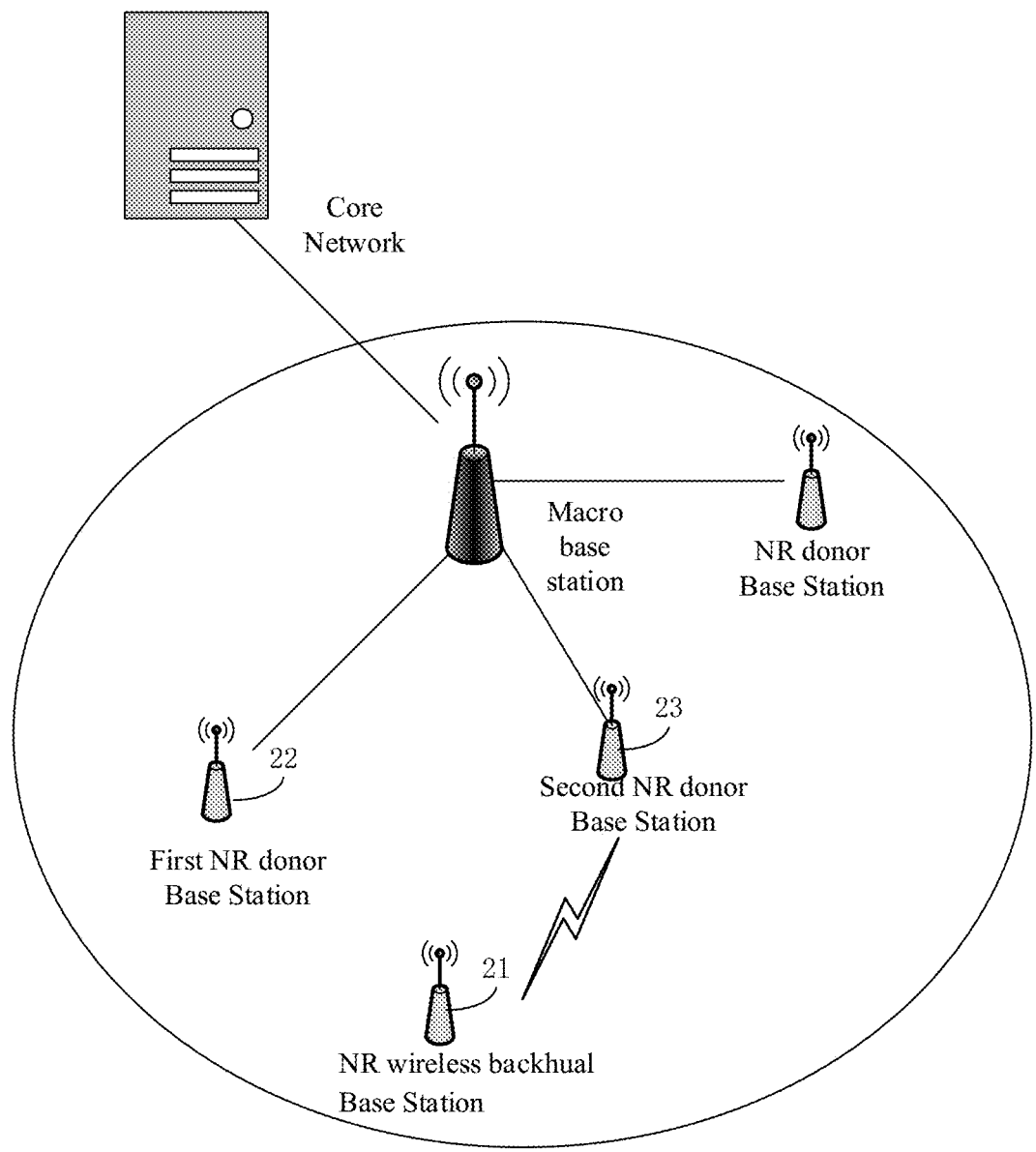
FIG. 2B is a second schematic diagram illustrating the relationship between the NR wireless backhaul base station and the NR donor base station according to an exemplary embodiment of the present disclosure.

Still taking FIG. 2A as an example, assuming that the signal quality of the first wireless backhaul link between the NR wireless backhaul base station 21 and the first NR donor base station 22 is less than the link reselection threshold for the NR wireless backhaul base station 21, then it is started to search for a neighboring NR donor base station. In a case that a NR donor base station which is searched out is a second NR donor base station 23, as illustrated in FIG. 2B, signal quality of a second wireless backhaul link between the NR wireless backhaul base station 21 and the second NR donor base station 23 is measured. In a case that the signal quality of the second wireless backhaul link being greater than a first threshold continues for a duration exceeding the first time length, a random access request is initiated to the second NR donor base station 23 so as to establish a wireless backhaul link with the second NR donor base station 23.

In the above embodiment, in a case that the signal quality of the first wireless backhaul link between the NR wireless backhaul base station and the first NR donor base station is less than the link reselection threshold for the NR wireless backhaul base station, it is started to search for the neighboring NR donor base station. The signal quality of the second wireless backhaul link between the NR wireless backhaul base station and the second NR donor base station, which is searched out, is measured, and in a case that the signal quality of the second wireless backhaul link being greater than the first threshold continues for a duration exceeding the first time length, the random access request is initiated to the second NR donor base station so as to establish the wireless backhaul link with the second NR donor base station, such that a better wireless backhaul link is found before the current wireless backhaul link is disconnected, thereby preventing the wireless backhaul link from being broken off.

Figure 3:
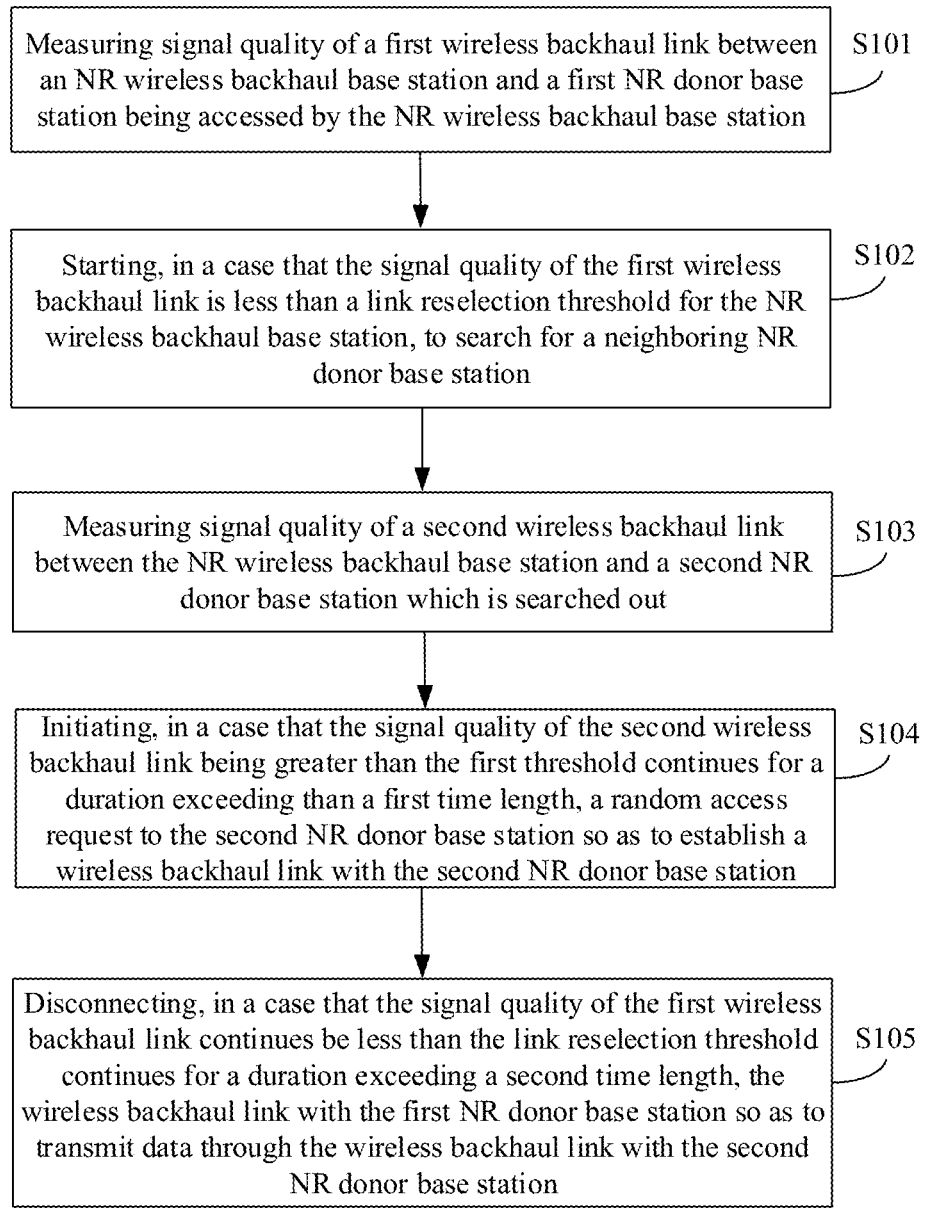
FIG. 3 is a flowchart of a method of restoring a wireless backhaul link according to another exemplary embodiment of the present disclosure.

FIG. 3 is a flowchart of a method of restoring a wireless backhaul link according to an exemplary embodiment of the present disclosure. As illustrated in FIG. 3, the method of restoring a wireless backhaul link may further include:

In step S105, in a case that the signal quality of the first wireless backhaul link being less than the link reselection threshold continues for a duration exceeding a second time length, the wireless backhaul link with the first NR donor base station is disconnected so as to transmit data through the wireless backhaul link with the second NR donor base station.

The second time length may be set as required. In a case that the signal quality of the first wireless backhaul link being less than the link reselection threshold for a duration exceeding a second time length, which indicates the signal quality of the wireless backhaul link between the NR wireless backhaul base station and the first NR donor base station is poor, the wireless backhaul link between the NR wireless backhaul base station and the first NR donor base station may be disconnected so as to transmit data through the wireless backhaul link between the NR wireless backhaul base station and the second NR donor base station.

In the foregoing embodiment, in a case that the signal quality of the first wireless backhaul link being less than the link reselection threshold continues for the duration exceeding the second time length, the wireless backhaul link with the first NR donor base station may be disconnected, such that data is transmitted through the wireless backhaul link between the NR wireless backhaul base station and the second NR donor base station, thereby guaranteeing the communication between the NR wireless backhaul link and the macro base station or the core network.

Figure 4:
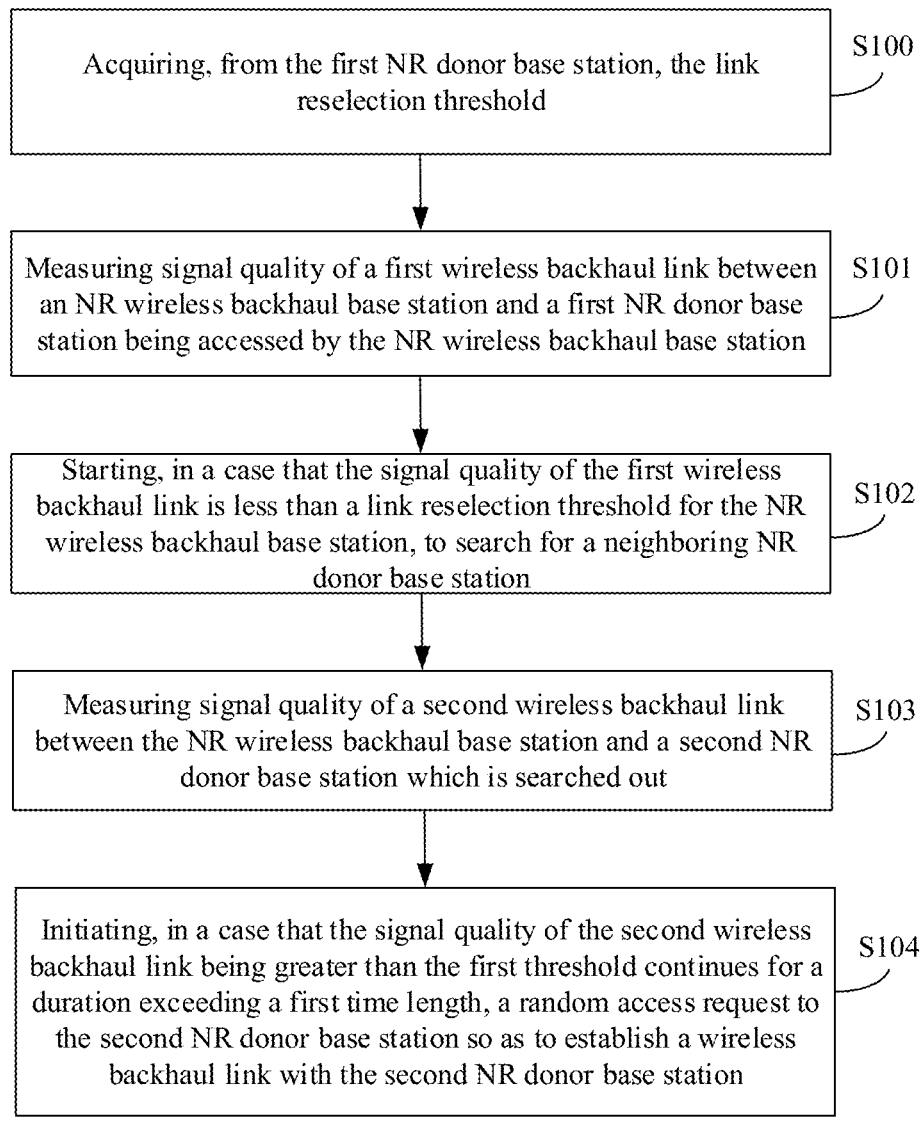
FIG. 4 is a flowchart of a method of restoring a wireless backhaul link according to still another exemplary embodiment of the present disclosure.

FIG. 4 is a flowchart of a method of restoring a wireless backhaul link according to another exemplary embodiment of the present disclosure. As illustrated in FIG. 4, the method of restoring a wireless backhaul link may further include:

In step S100, the link reselection threshold is acquired from the first NR donor base station.

The link reselection threshold can be acquired from the first NR donor base station in multiple ways, for example, any one of the following two manners:

Manner I: the link reselection threshold is acquired from configuration information which is received from the first NR donor base station after the NR wireless backhaul base station accesses the first NR donor base station.

Manner II: the link reselection threshold is received from broadcast signaling which is broadcasted by the first NR donor base station.

Thus, in this embodiment, the link reselection threshold can be acquired in various ways, and the implementation manners are flexible and diverse.

It should be noted that there is no specific execution order for the above steps S100 and S101.

In the above-mentioned embodiment, through acquiring the link reselection threshold from the first NR donor base station, it provides conditions for subsequent comparison of the signal quality of the first wireless backhaul link with the link reselection threshold, thereby providing conditions for subsequently restoring broken wireless backhaul.

Figure 5:
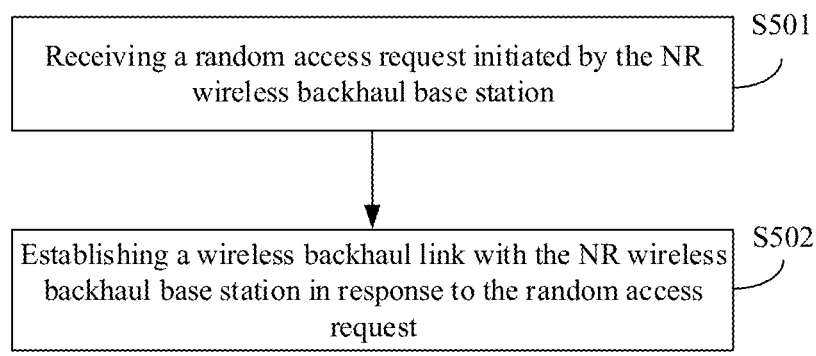
FIG. 5 is a flowchart of a method of establishing a wireless backhaul link according to an exemplary embodiment of the present disclosure.

FIG. 5 is a flowchart of a method of establishing a wireless backhaul link according to an exemplary embodiment of the present disclosure. This embodiment is described from the side of the NR donor base station. As illustrated in FIG. 5, the method of establishing a wireless backhaul link may include:

In step S501, a random access request initiated by the NR wireless backhaul base station is received.

Optionally, the method may further include: transmitting, upon detecting the random access request from an NR wireless backhaul base station, configuration information to the NR wireless backhaul base station, such that the NR wireless backhaul base station acquires a link reselection threshold. The method may further include: broadcasting a link reselection threshold through broadcast signaling. In this way, the NR wireless backhaul base station can acquire the link reselection threshold, which provides conditions for the NR wireless backhaul base station to compare subsequently the signal quality of the first wireless backhaul link with the link reselection threshold.

In step S502, a wireless backhaul link is established with the NR wireless backhaul base station.

In the above embodiment, through responding to the random access request initiated by the NR wireless backhaul base station and establishing the wireless backhaul link with the NR wireless backhaul base station, the wireless backhaul link can be established between the NR wireless backhaul base station and the NR donor base station, such that data can be transmitted on the basis of the established wireless backhaul link.

Figure 6:
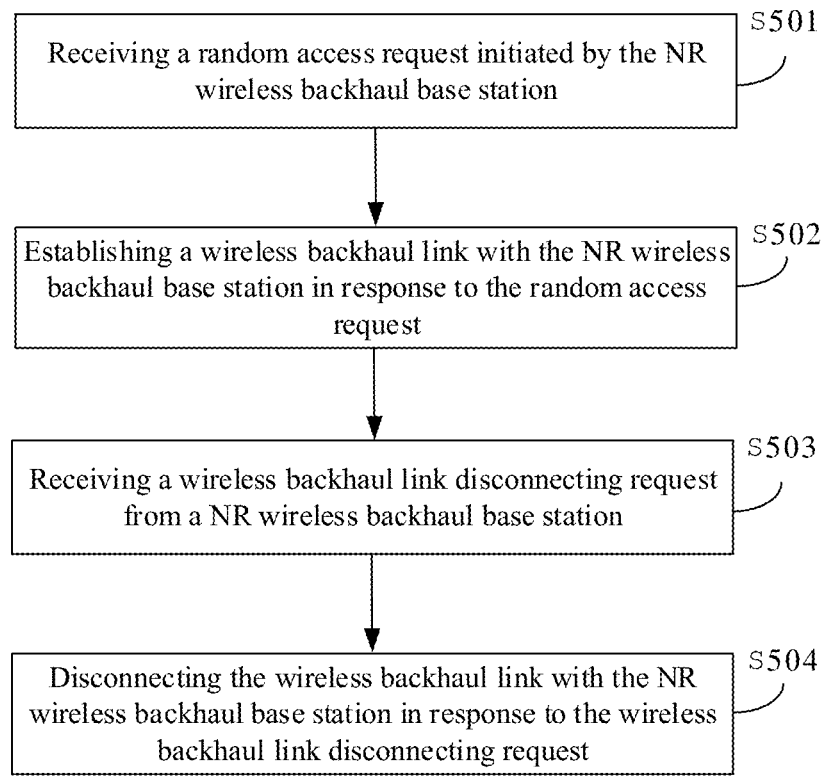
FIG. 6 is a flowchart of a method of establishing a wireless backhaul link according to another exemplary embodiment of the present disclosure.

FIG. 6 is a flowchart of a method of establishing a wireless backhaul link according to another exemplary embodiment of the present disclosure. As illustrated in FIG. 6, the method of establishing a wireless backhaul link may further include:

In step S503, a wireless backhaul link disconnecting request is received from a NR wireless backhaul base station.

In step S504, the wireless backhaul link with the NR wireless backhaul base station is disconnected in response to the wireless backhaul link disconnecting request.

In the above embodiment, through receiving the wireless backhaul link disconnecting request from the NR wireless backhaul base station, and disconnecting the wireless backhaul link with the NR wireless backhaul base station in response to the wireless backhaul link disconnecting request, the corresponding wireless backhaul link can be disconnected in a case that signal quality of the wireless backhaul link between the NR wireless backhaul base station and the NR donor base station is poor.

Figure 7:
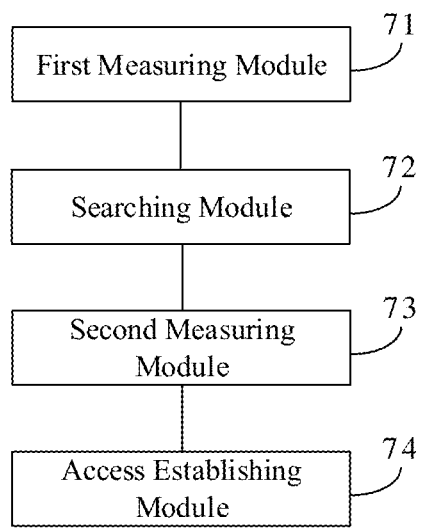
FIG. 7 is a block diagram illustrating a device for restoring a wireless backhaul link according to an exemplary embodiment of the present disclosure.

FIG. 7 is a block diagram illustrating a device for restoring wireless backhaul link according to an exemplary embodiment of the present disclosure, the device may be applicable to an NR wireless backhaul base station. As illustrated in FIG. 7, the device includes: a first measuring module 71, a searching module 72, a second measuring module 73, and an access establishing module 74.

The first measuring module 71 is configured to measure signal quality of a first wireless backhaul link between an NR wireless backhaul base station and a first NR donor base station being accessed by the NR wireless backhaul base station.

As illustrated in FIG. 2A, the NR wireless backhaul base station 21 accesses the first NR donor base station 22, and the first NR donor base station 22 communicates with the core network through the macro base station. In addition to the first NR donor base station 22, there are additional NR donor base stations communicate with the core network through the macro base station.

It should be noted that FIG. 2A is a schematic diagram just illustrating a relationship between the NR wireless backhaul base station and the NR donor base station. FIG. 2A is introduced here only to describe more clearly the relationship between the NR wireless backhaul base station and the NR donor base station. In actual practice, the number of NR donor base stations and the connection relationship with the NR wireless backhaul base stations may be different from what is illustrated in FIG. 2A.

In this embodiment, after the NR wireless backhaul base station accesses the first NR donor base station, the NR wireless backhaul base station measures signal quality of a first wireless backhaul link between the NR wireless backhaul base station and the first NR donor base station, for example, reference signal receiving power RSRP or reference signal receiving quality RSRQ, and etc.

The searching module 72 is configured to start to search for a neighboring NR donor base station in a case that the signal quality of the first wireless backhaul link measured by the first measuring module 71 is less than the link reselection threshold for the NR wireless backhaul base station.

The second measuring module 73 is configured to measure signal quality of a second wireless backhaul link between the NR wireless backhaul base station and a second NR donor base station that is searched out by the searching module 72.

The access establishing module 74 is configured to initiate, in a case that the signal quality of the second wireless backhaul link measured by the second measuring module 73 being greater than a first threshold continues for a duration exceeding a first time length, a random access request to the second NR donor base station so as to establish a wireless backhaul link with the second NR donor base station.

The first threshold can be set according to requirements. In a case that the signal quality of the second wireless backhaul link being greater than the first threshold continues for the duration exceeding the first time length, it indicates that a wireless backhaul link can be established between the NR wireless backhaul base station and the second NR donor base station.

Still referring to FIG. 2A as an example, assuming that the signal quality of the first wireless backhaul link between the NR wireless backhaul base station 21 and the first NR donor base station 22 is less than the link reselection threshold for the NR wireless backhaul base station 21, it is started to search for a neighboring NR donor base station. In a case that a NR donor base station that is searched out is the second NR donor base station 23, as illustrated in FIG. 2B, signal quality of a second wireless backhaul link between the NR wireless backhaul base station 21 and the second NR donor base station 23 is measured. In a case that the signal quality of the second wireless backhaul link being greater than a first threshold continues for a duration exceeding the first time length, a random access request is initiated to the second NR donor base station 23 so as to establish a wireless backhaul link with the second NR donor base station 23.

In the above embodiment, in a case that the signal quality of the first wireless backhaul link between the NR wireless backhaul base station and the first NR donor base station is less than the link reselection threshold for the NR wireless backhaul base station, it is started to search for the neighboring NR donor base station. The signal quality of the second wireless backhaul link between the NR wireless backhaul base station and the second NR donor base station which is searched out is measured, and in a case that the signal quality of the second wireless backhaul link being greater than the first threshold continues for a duration exceeding the first length, a random access request is initiated to the second NR donor base station so as to establish a wireless backhaul link with the second NR donor base station, thereby finding a better wireless backhaul link before the current wireless backhaul link is broken off and preventing the wireless backhaul link from being broken off.

Figure 8:
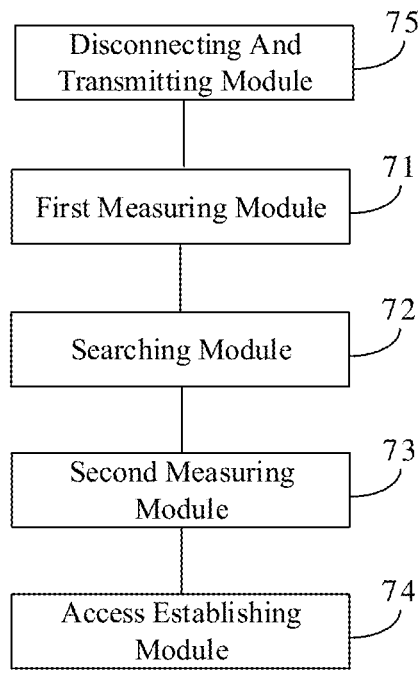
FIG. 8 is a block diagram illustrating a device of restoring a wireless backhaul link according to another exemplary embodiment of the present disclosure.

FIG. 8 is a block diagram illustrating a device for restoring wireless backhaul link according to another exemplary embodiment of the present disclosure. As illustrated in FIG. 8, based on the embodiment illustrated in FIG. 7, the device may further include:

a disconnecting and transmitting module 75, configured to disconnect, in a case that the signal quality of the first wireless backhaul link measured by the first measuring module 71 being less than the link reselection threshold continues for a duration exceeding a second time length, from the first NR donor base station so as to transmit data through the wireless backhaul link with the second NR donor base station.

The second threshold can be set as required. In a case that the signal quality of the first wireless backhaul link being less than the link reselection threshold continues for the duration exceeding the second time length, which indicates that the signal quality of the wireless backhaul link between the NR wireless backhaul base station and the first NR donor base station is poor, the wireless backhaul link between the NR wireless backhaul base station and the first NR donor base station may be disconnected such that data can be transmitted through the wireless backhaul link with the second NR donor base station.

In the foregoing embodiment, in a case that the signal quality of the first wireless backhaul link being less than the link reselection threshold continues for the duration exceeding the second time length, the wireless backhaul link with the first NR donor base station is disconnected such that data is transmitted through the wireless backhaul link with the second NR donor base station, thereby guaranteeing the communication between the wireless backhaul link and the macro base station or the core network.

Figure 9:
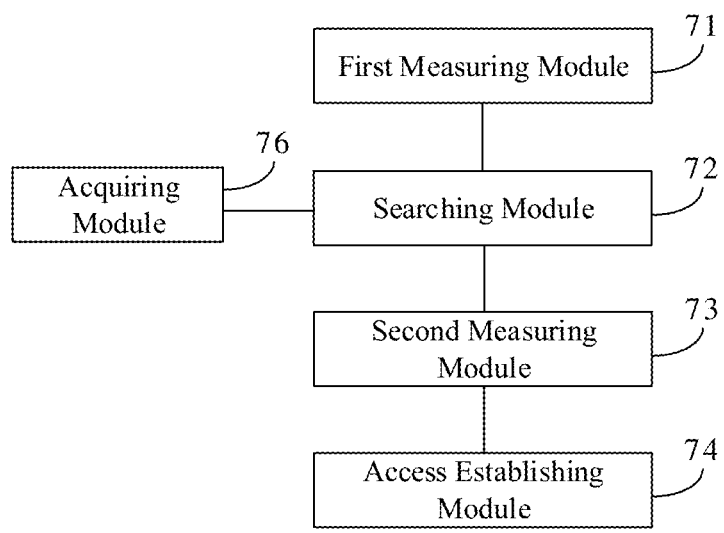
FIG. 9 is a block diagram illustrating a device for restoring a wireless backhaul link according to still another exemplary embodiment of the present disclosure.

FIG. 9 is a block diagram illustrating a device for restoring a wireless backhaul link according to another exemplary embodiment of the present disclosure. As illustrated in FIG. 9, based on the embodiment illustrated in FIG. 7, the device may further include:

an acquiring module 76, configured to acquire, before the searching module 72 starts to search for the neighboring NR donor base station, the link reselection threshold from the first NR donor base station.

In the above-mentioned embodiment, through acquiring the link reselection threshold from the first NR donor base station, it provides conditions for subsequent comparison of the signal quality of the first wireless backhaul link with the link reselection threshold, thereby providing conditions for subsequently restoring broken wireless backhaul.

Figure 10:
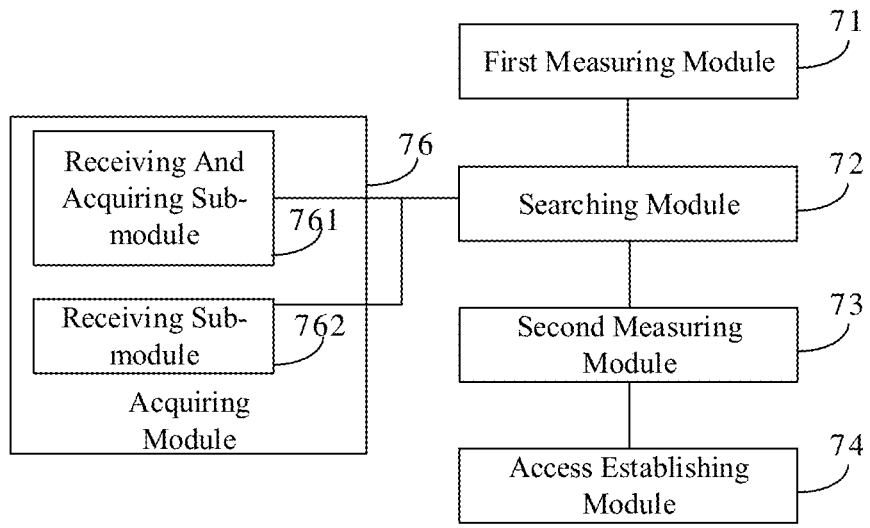
FIG. 10 is a block diagram illustrating a device for restoring wireless backhaul link according to yet another exemplary embodiment of the present disclosure.

FIG. 10 is a block diagram illustrating a device for restoring wireless backhaul link according to another exemplary embodiment. As illustrated in FIG. 10, on the basis of the embodiment illustrated in FIG. 9, the acquiring module 76 may include: a receiving and acquiring sub-module 761 or a receiving sub-module 762.

The receiving and acquiring sub-module 761 is configured to acquire a link reselection threshold from configuration information which is received from the first NR donor base station after accessing the first NR donor base station.

The receiving sub-module 762 is configured to receive the link reselection threshold from broadcast signaling which is broadcast by the first NR donor base station.

In the foregoing embodiment, the link reselection threshold can be acquired in multiple ways, and the implementation manners are flexible and diverse.

Figure 11:
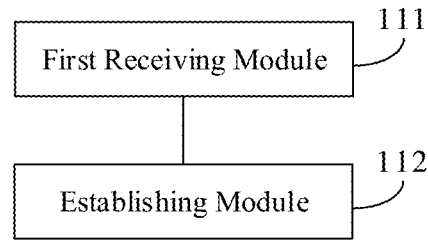
FIG. 11 is a block diagram illustrating a device for establishing a wireless backhaul link according to an exemplary embodiment of the present disclosure.

FIG. 11 is a block diagram illustrating a device for establishing a wireless backhaul link according to an exemplary embodiment. The apparatus may applicable to an NR donor base station. As illustrated in FIG. 11, the device includes: a first receiving module 111 and an establishing module 112.

The first receiving module 111 is configured to respond to a random access request initiated by the NR wireless backhaul base station.

The establishing module 112 is configured to establish, after the first receiving module 111 responding to the random access request initiated by the NR wireless backhaul base station, a wireless backhaul link with the NR wireless backhaul base station.

In the above embodiment, through responding to the random access request initiated by the NR wireless backhaul base station and establishing the wireless backhaul link with the NR wireless backhaul base station, the NR wireless backhaul base station can establish a wireless backhaul link with the NR donor base station such that data can be transmitted on the basis of the established wireless backhaul link.

Figure 12:
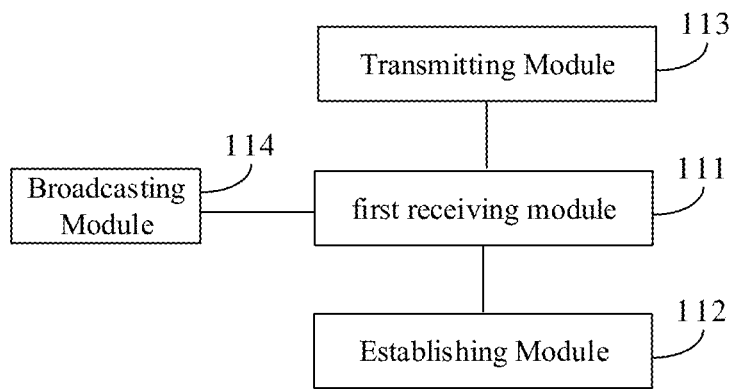
FIG. 12 is a block diagram illustrating a device for establishing a wireless backhaul link according to another exemplary embodiment of the present disclosure.

FIG. 12 is a block diagram illustrating a device for establishing a wireless backhaul link according to another exemplary embodiment of the present disclosure. As illustrated in FIG. 12, based on the embodiment illustrated in FIG. 11, the device further includes at least any one of the following: a transmitting module 113 and a broadcasting module 114.

The transmitting module 113 is configured to transmit, before the first receiving module 111 receiving the random access request initiated by the NR wireless backhaul base station and in a case that an access request from the NR wireless backhaul base station is detected, configuration information to the NR wireless backhaul base station, such that the NR wireless backhaul base station acquires the link reselection threshold.

The broadcasting module 114 is configured to broadcast, before the first receiving module 111 receiving the random access request initiated by the NR wireless backhaul base station, the link reselection threshold through broadcast signaling.

In the above embodiment, through transmitting the configuration information to the NR wireless backhaul base station or through broadcasting the link reselection threshold via the broadcast signaling, the NR wireless backhaul base station can acquire the link reselection threshold, so as to provide condition to the NR wireless backhaul base station to subsequently compare the signal quality of the first wireless backhaul link with the link reselection threshold.

Figure 13:
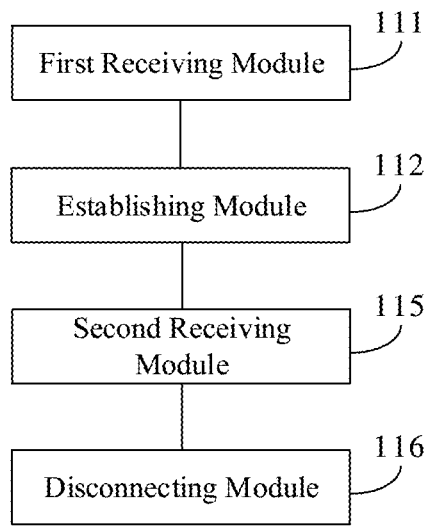
FIG. 13 is a block diagram illustrating a device for establishing a wireless backhaul link according to still another exemplary embodiment of the present disclosure.

FIG. 13 is a block diagram illustrating a device for establishing a wireless backhaul link according to another exemplary embodiment. As illustrated in FIG. 13, on the basis of the embodiment illustrated in FIG. 11, the device further includes: a second receiving module 115 and a disconnecting module 116.

The second receiving module 115 is configured to receive, after the establishing module 112 establishing the wireless backhaul link with the NR wireless backhaul base station, a wireless backhaul link disconnecting request from the NR wireless backhaul base station.

The disconnecting module 116 is configured to disconnect the wireless backhaul link with the NR wireless backhaul base station in response to the wireless backhaul link disconnecting request received by the second receiving module 115.

In the above embodiment, through receiving the wireless backhaul link disconnecting request from the NR wireless backhaul base station, and disconnecting the wireless backhaul link with the NR wireless backhaul base station in response to the wireless backhaul link disconnecting request, the corresponding wireless backhaul link can be disconnected in a case that the signal quality between the NR wireless backhaul base station and the NR donor base station is poor.

Figure 14:
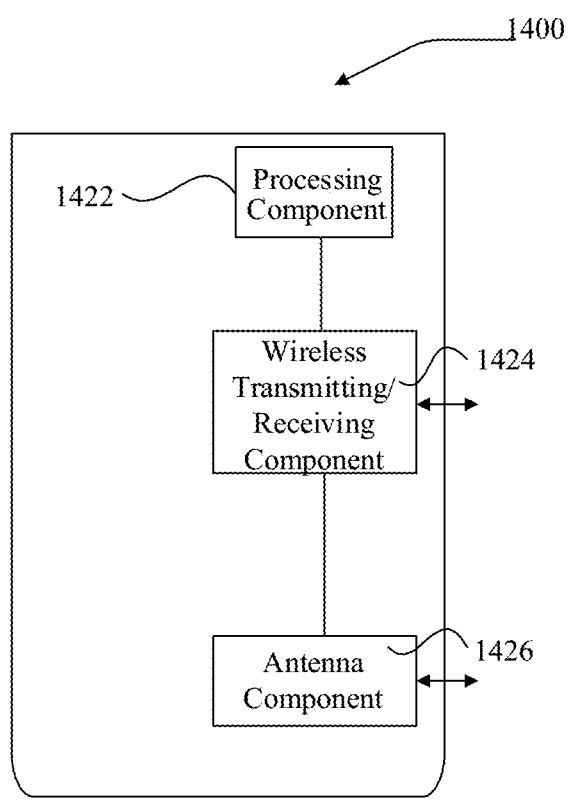
FIG. 14 is a block diagram illustrating an apparatus suitable for restoring wireless backhaul link or for establishing wireless backhaul link according to an exemplary embodiment of the present disclosure.

FIG. 14 is a block diagram illustrating an apparatus suitable for restoring or establishing a wireless backhaul link according to an exemplary embodiment of the present disclosure. The apparatus 1400 may be provided as an NR wireless backhaul base station or an NR donor base station. Referring to FIG. 14, the apparatus 1400 includes a processing component 1422, a wireless transmitting/receiving component 1424, an antenna component 1426, and a signal processing part specific to a wireless interface. The processing component 1422 may further include one or more processors.

In a case that the apparatus 1400 is provided as an NR wireless backhaul base station, one of the processors of the processing component 1422 may be configured to:

measure signal quality of a first wireless backhaul link between a NR wireless backhaul base station and a first NR donor base station being accessed by the NR wireless backhaul base station;

start, in a case that the signal quality of the first wireless backhaul link is less than a link reselection threshold for the NR wireless backhaul base station, to search for a neighboring NR donor base station;

measure signal quality of a second wireless backhaul link between the NR wireless backhaul base station and a second NR donor base station which is searched out; and initiate, in a case that the signal quality of the second wireless backhaul link being greater than a first threshold continues for a duration exceeding a first time length, a random access request to the second NR donor base station so as to establish a wireless backhaul link with the second NR donor base station.

In a case that the apparatus 1400 is provided as an NR donor base station, one of the processors in the processing component 1422 may be configured to:

respond to a random access request initiated by an NR wireless backhaul base station; and establish a wireless backhaul link with the NR wireless backhaul base station.

In an exemplary embodiment, there is further provided a non-transitory computer-readable storage medium including instructions, which can be executed by the processing component 1422 of the device 1400 to complete the method of restoring wireless backhaul link described above. For example, the non-transitory computer-readable storage medium may be a ROM, a random-access memory (RAM), a CD-ROM, a magnetic tape, a floppy disk, an optical data storage device, and etc.

In an exemplary embodiment, there is further provided a non-transitory computer-readable storage medium including instructions, which can be executed by the processing component 1422 of the device 1400 to complete the method of establishing wireless backhaul link as described above. For example, the non-transitory computer-readable storage medium may be a ROM, a random-access memory (RAM), a CD-ROM, a magnetic tape, a floppy disk, an optical data storage device, and etc.

For the device embodiments, since they substantially correspond to the method embodiment, the relevant part can be referred to the part of the description of the method embodiments. The device embodiments described above are merely illustrative. The units described as separate components may or may not be physically separated, and the components displayed as a unit may or may not be physical units, that is, they may be located in one place. Or it can be distributed over multiple network units. Some or all of the modules may be selected according to actual requirements to achieve the objectives of the solutions of the embodiments. One of ordinary skill in the art can understand and implement it without any creative work.

It should be noted that in this article, relational terms such as first and second are only used to distinguish one entity or operation from another entity or operation, and do not necessarily require or imply any actual relationship or sequence between entities or operations. The terms "include", "comprise" or any other variants thereof are intended to cover non-exclusive inclusion, so that a process, method, article or device including a series of elements not only includes those elements, but also includes other elements not explicitly listed, or also include elements inherent to such processes, methods, articles, or equipment. If there are no additional restrictions, the element defined by the sentence "including a . . . " does not exclude the existence of other identical elements in the process, method, article, or equipment that includes the element.

After considering the specification and practicing the disclosure disclosed herein, one of ordinary skill skilled in the art will easily think of other embodiments of the present disclosure. This disclosure is intended to cover any variations, uses, or adaptive changes of the present disclosure. These variations, uses, or adaptive changes follow the general principles of the present disclosure and include common knowledge or conventional technical means of the technical field not disclosed in the present disclosure. The description and the embodiments are to be regarded as exemplary only, and the true protection scope and spirit of the present disclosure are set forth by the following claims.

It should be understood that the present disclosure is not limited to the exact structure that has been described above and illustrated in the drawings, and various modifications and variants can be made without departing from its protection scope. The protection scope of the present disclosure is limited only by the appended claims.

What is claimed is:

1. A method of restoring wireless backhaul link, applicable to a new radio (NR) wireless backhaul base station, and comprising:
    measuring signal quality of a first wireless backhaul link between an NR wireless backhaul base station and a first NR donor base station being accessed by the NR wireless backhaul base station;
    starting, in a case that the signal quality of the first wireless backhaul link is less than a link reselection threshold for the NR wireless backhaul base station, to search for a neighboring NR donor base station;
    measuring signal quality of a second wireless backhaul link between the NR wireless backhaul base station and a second NR donor base station which is searched out;
    initiating, in a case that the signal quality of the second wireless backhaul link being greater than a first threshold continues for a duration exceeding a first time length, a random access request to the second NR donor base station so as to establish a wireless backhaul link with the second NR donor base station; and disconnecting, in a case that the signal quality of the first wireless backhaul link being less than the link reselection threshold continues for a duration exceeding a second time length, the wireless backhaul link with the first NR donor base station after establishing the wireless backhaul link with the second NR donor base station so as to transmit data through the wireless backhaul link with the second NR donor base station.

2. The method according to claim 1, further comprising:
acquiring, from the first NR donor base station, the link reselection threshold.

3. The method according to claim 2, wherein acquiring, from the first NR donor base station, the link reselection threshold comprises any one of the following:

acquiring the link reselection threshold from configuration information which is received, after accessing the first NR donor base station, the configuration information from the first NR donor base station, and acquiring the link reselection threshold according to the configuration information; and receiving the link reselection threshold from broadcast signaling which is broadcast by the first NR donor base station.

4. A communication system implementing the method according to claim 1, comprising the NR wireless backhaul base station, wherein the NR wireless backhaul base station is configured to find a better wireless backhaul link for data transmission before a current wireless backhaul link is disconnected, thereby preventing the wireless backhaul link from being broken off.

5. The communication system according to claim 4, further comprising the second NR donor base station configured to:

receive the random access request initiated by the NR wireless backhaul base station; and establishing the wireless backhaul link with the NR wireless backhaul base station in response to the random access request for data transmission.

6. A non-transitory computer-readable storage medium having instructions stored thereon for execution by a processing circuit to implement operations of the method according to claim 1.

7. The non-transitory computer-readable storage medium according to claim 6, wherein the operations further comprise:

receiving the random access request initiated by the NR wireless backhaul base station; and establishing the wireless backhaul link with the NR wireless backhaul base station in response to the random access request.

8. A new radio (NR) wireless backhaul base station, comprising:

a processor;

memory, configured to store instructions executable by the processor;

wherein the processor is configured to:

measure signal quality of a first wireless backhaul link between the NR wireless backhaul base station and a first NR donor base station being accessed by the NR wireless backhaul base station;

start, in a case that the signal quality of the first wireless backhaul link is less than a link reselection threshold for the NR wireless backhaul base station, to search for a neighboring NR donor base station;

measure signal quality of a second wireless backhaul link between the NR wireless backhaul base station and a second NR donor base station which is search out;

initiate, in a case that the signal quality of the second wireless backhaul link being greater than a first threshold continues for a duration exceeding the first time length, a random access request to the second NR donor base station so as to establish a wireless backhaul link with the second NR donor base station; and disconnect, in a case that the signal quality of the first wireless backhaul link being less than the link reselection threshold continues for a duration exceeding a second time length, the wireless backhaul link with the first NR donor base station after establishing the wireless backhaul link with the second NR donor base station so as to transmit data through the wireless backhaul link with the second NR donor base station.

9. The NR wireless backhaul base station according to claim 8, wherein the processor is further configured to:

acquire, from the first NR donor base station, the link reselection threshold.

10. The NR wireless backhaul base station according to claim 8, wherein in a case that the processor is configured to acquire, from the first NR donor base station, the link reselection threshold, the processor is configured to perform at least one of:

acquiring the link reselection threshold from configuration information which is received, after accessing the first NR donor base station, the configuration information from the first NR donor base station, and acquiring the link reselection threshold according to the configuration information; and receiving the link reselection threshold from broadcast signaling which is broadcast by the first NR donor base station.

* * * * *